United States Patent [19]

Shafir

[11] Patent Number: 4,817,222
[45] Date of Patent: Apr. 4, 1989

[54] METHOD AND APPARATUS FOR MAKING SHOE LASTS AND/OR SHOE COMPONENTS

[76] Inventor: Aharon Shafir, Leon Blum St. 9, Tel Aviv, Israel

[21] Appl. No.: 109,297

[22] Filed: Oct. 15, 1987

[51] Int. Cl.⁴ .............................. A43D 1/04; A43D 1/00
[52] U.S. Cl. .................................................... 12/146 L
[58] Field of Search .............. 12/146 L, 7 R; 364/474; 128/660

[56] References Cited

U.S. PATENT DOCUMENTS

| | | | |
|---|---|---|---|
| 2,009,471 | 7/1935 | Braver et al. | 12/146 L |
| 3,391,392 | 7/1986 | Doyle | 340/172.5 |
| 3,696,456 | 10/1972 | Dunham et al. | 12/146 L |
| 4,412,364 | 11/1983 | Mateo | 12/146 L |
| 4,452,057 | 6/1984 | Davies et al. | 69/6.5 |
| 4,458,689 | 7/1984 | Sorenson et al. | 128/660 |
| 4,541,054 | 9/1985 | Peck et al. | 364/474 |
| 4,558,420 | 12/1985 | Gerber | 364/476 |
| 4,598,376 | 7/1986 | Burton et al. | 364/470 |

FOREIGN PATENT DOCUMENTS 2417168 11/1974 United Kingdom .............. 12/146 L
1414298 11/1975 United Kingdom .............. 12/146 L

OTHER PUBLICATIONS

"The Story of Lasts" ©1948 issued by National Shoe Manufactures Association.

Primary Examiner—Steven N. Meyers
Attorney, Agent, or Firm—Donald Brown; Benjamin J. Barish

[57] ABSTRACT

A method and apparatus for making shoe lasts, involves digitizing on the fly a large number of sample points on the outer surface of a model last representing a particular shoe style to produce a model last digital file representing the three-dimensional surface contour of the respective model last; grading the model last digital file to produce one or more graded last digital files each representing a different last size of the respective shoe style; and utilizing each of the graded last digital files to produce a graded shoe last of the respective shoe style. The invention may also be utilized for making graded components of shoes, and for modifying shoe styles or creating new shoe styles by CAD/CAM techniques.

29 Claims, 14 Drawing Sheets

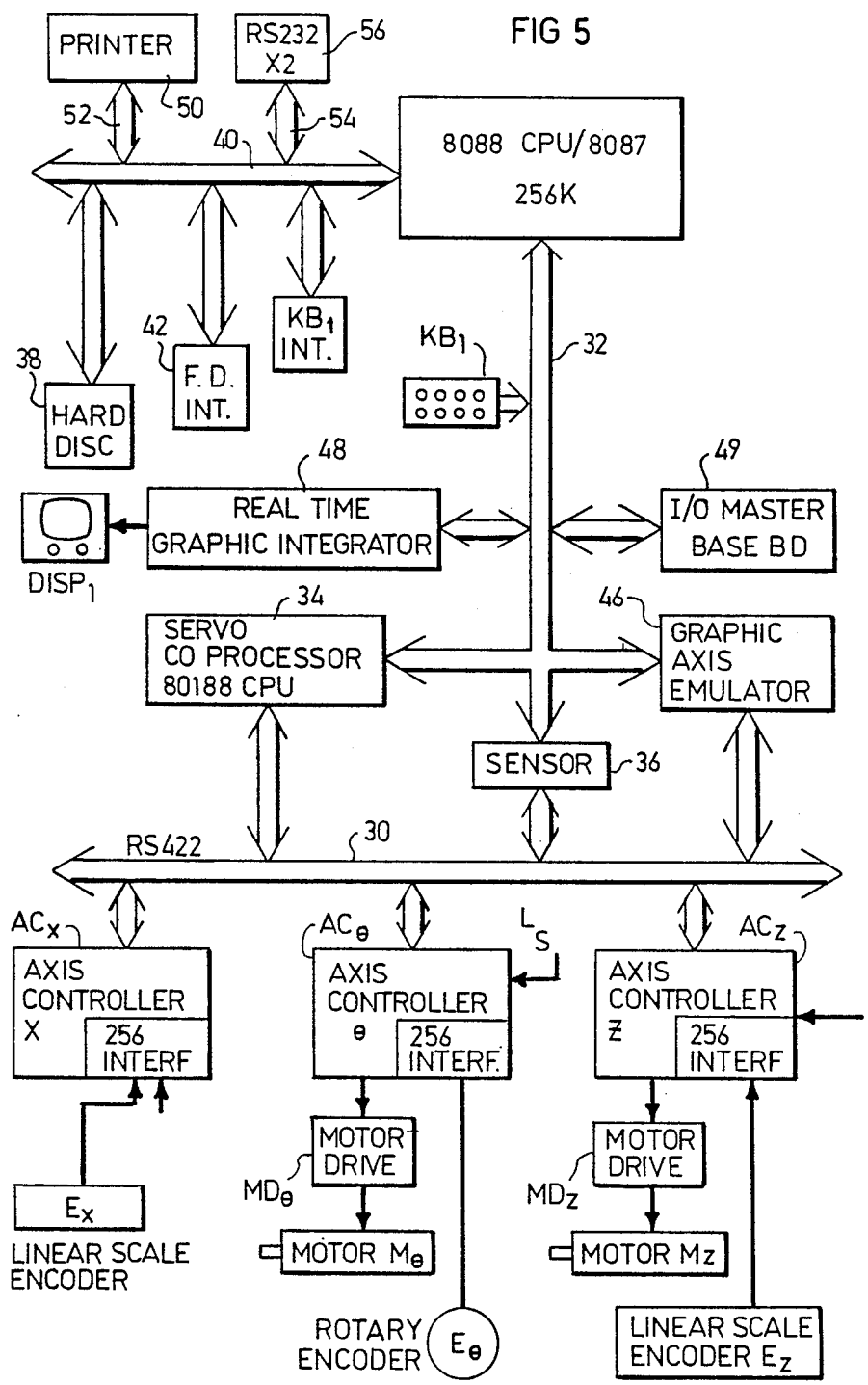

FIG 6  MMI FOR DIGITIZER COMPUTER
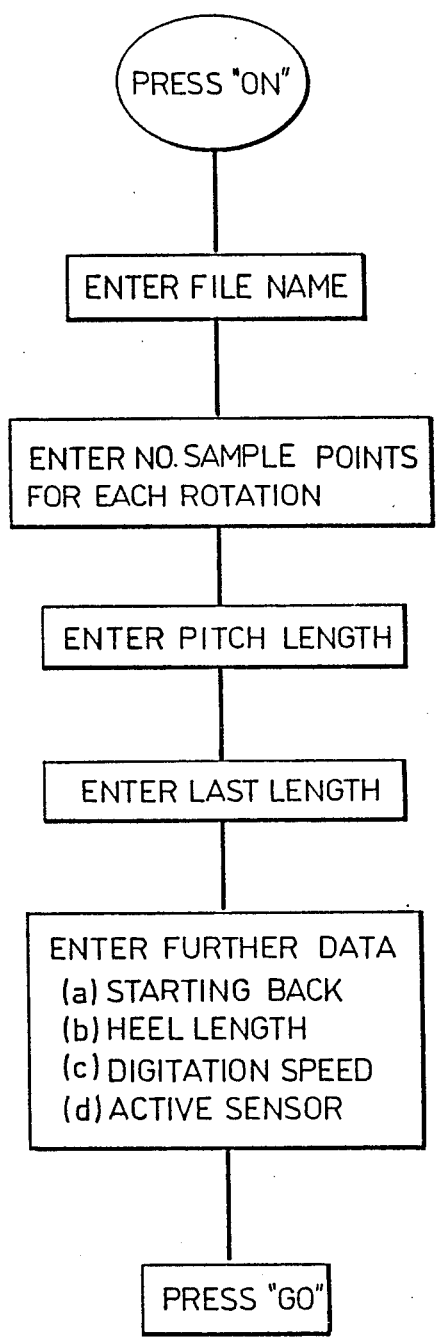

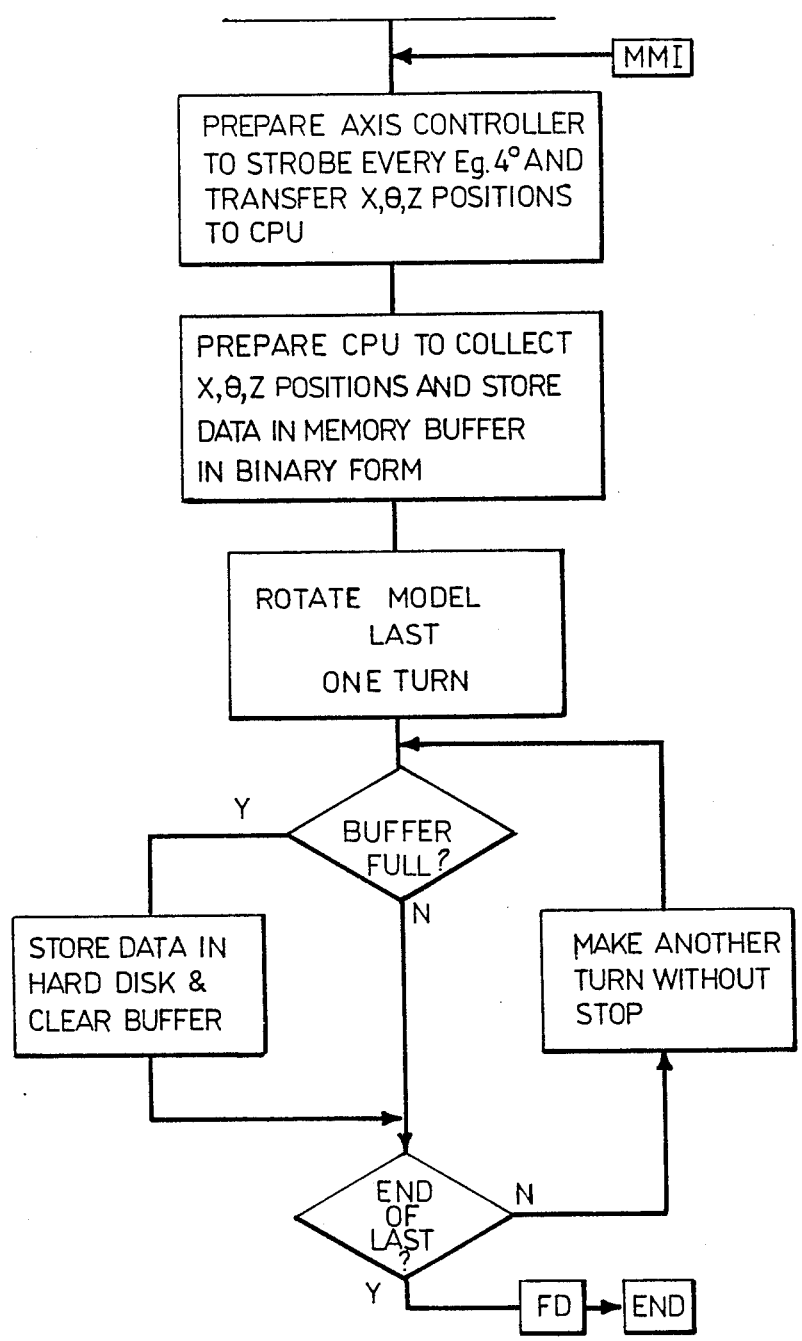
FIG 7 DIGITAL SOFTWARE

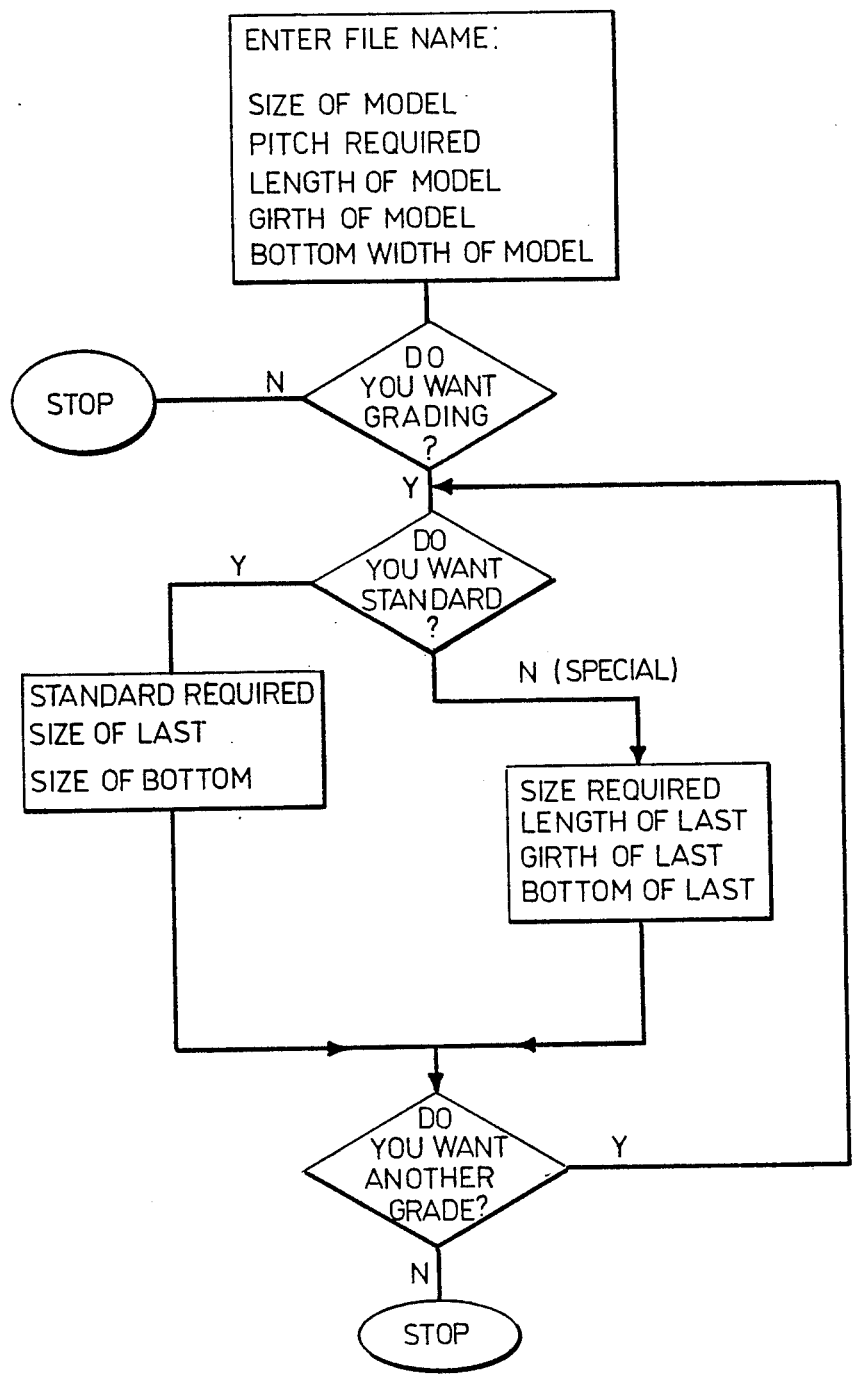
FIG 8 MMI GRADING COMPUTER

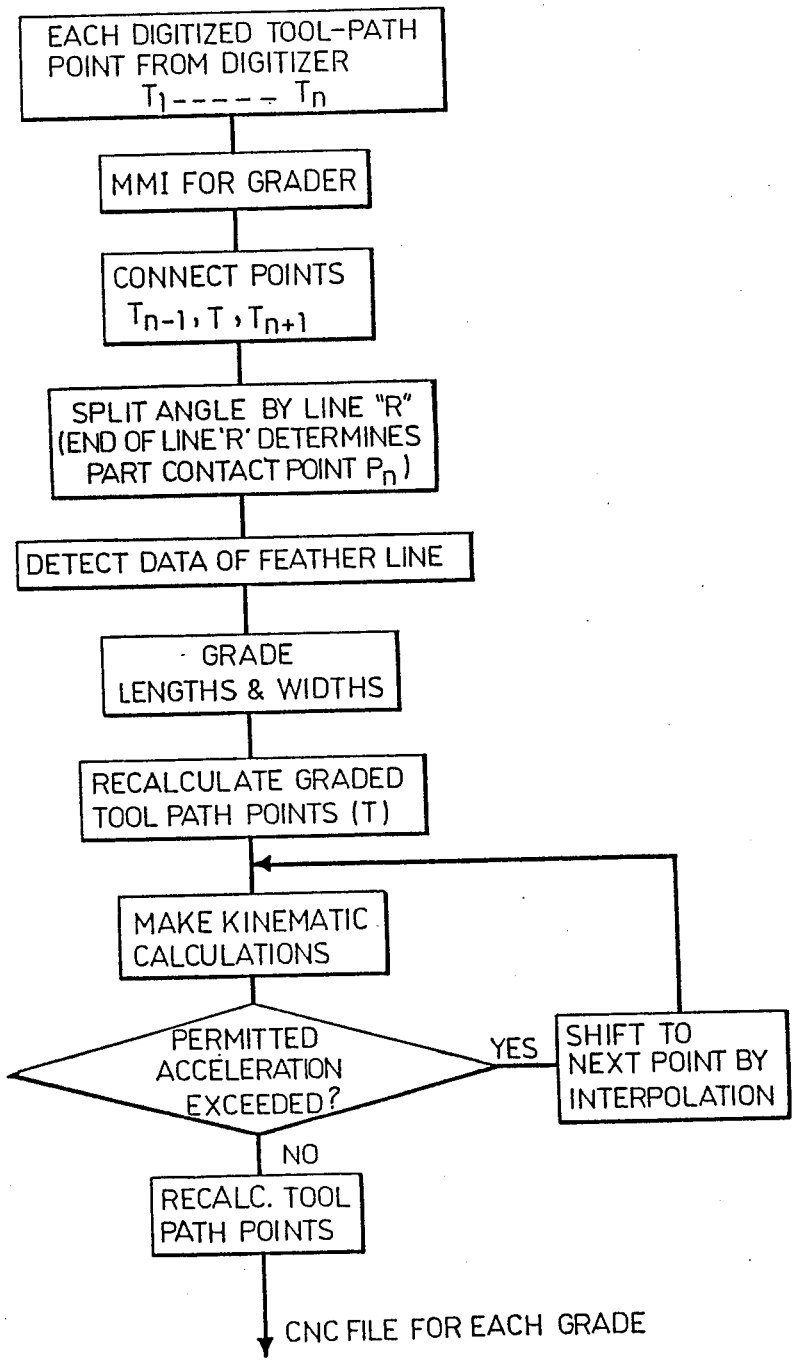
FIG 9 GRADING SOFTWARE

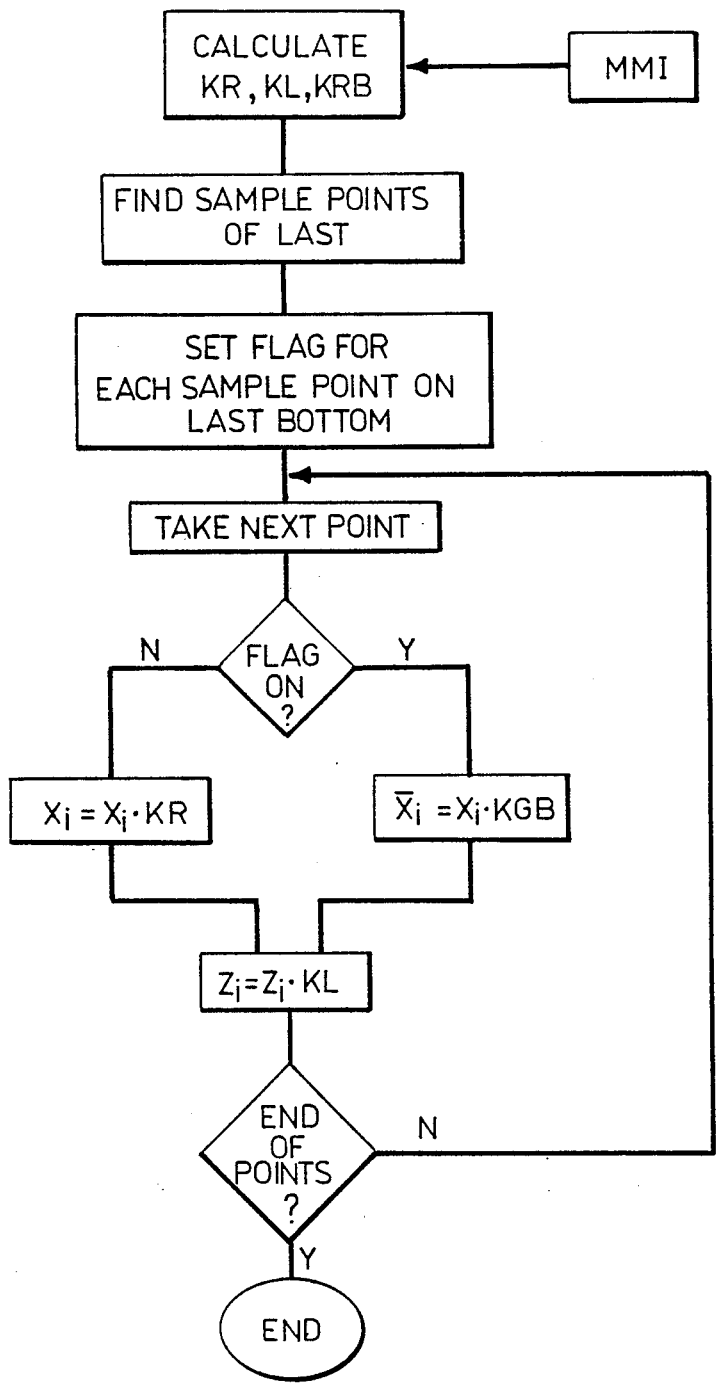
FIG 12 GRADING WITH BOTTOM HOLDING

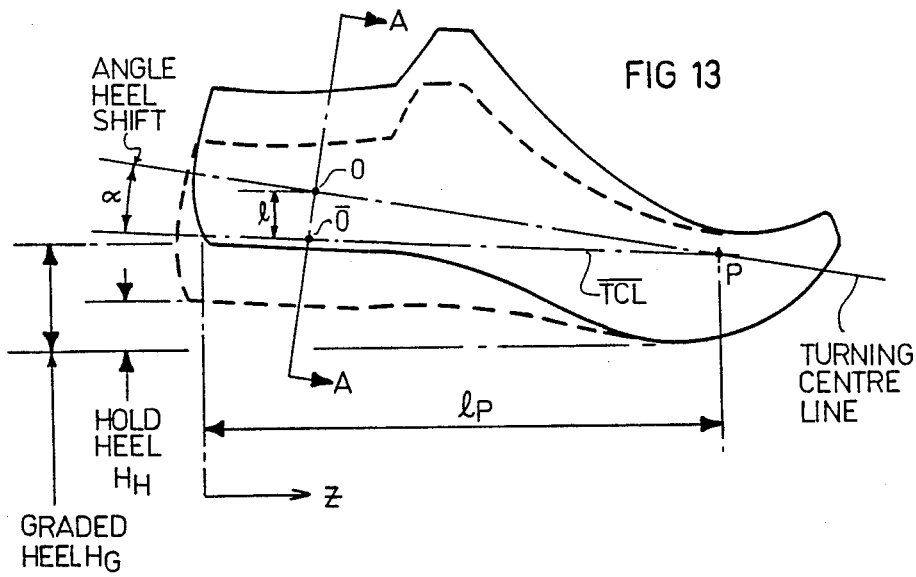
FIG 13
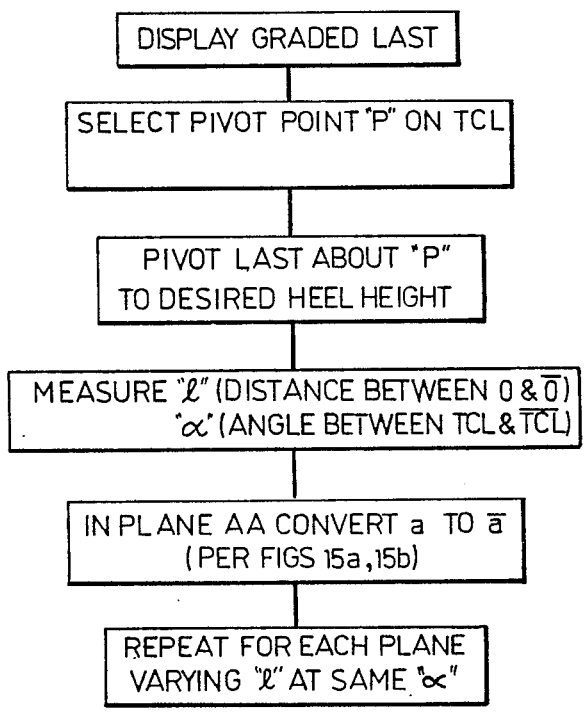
FIG 14 HOLD HEEL HEIGHT

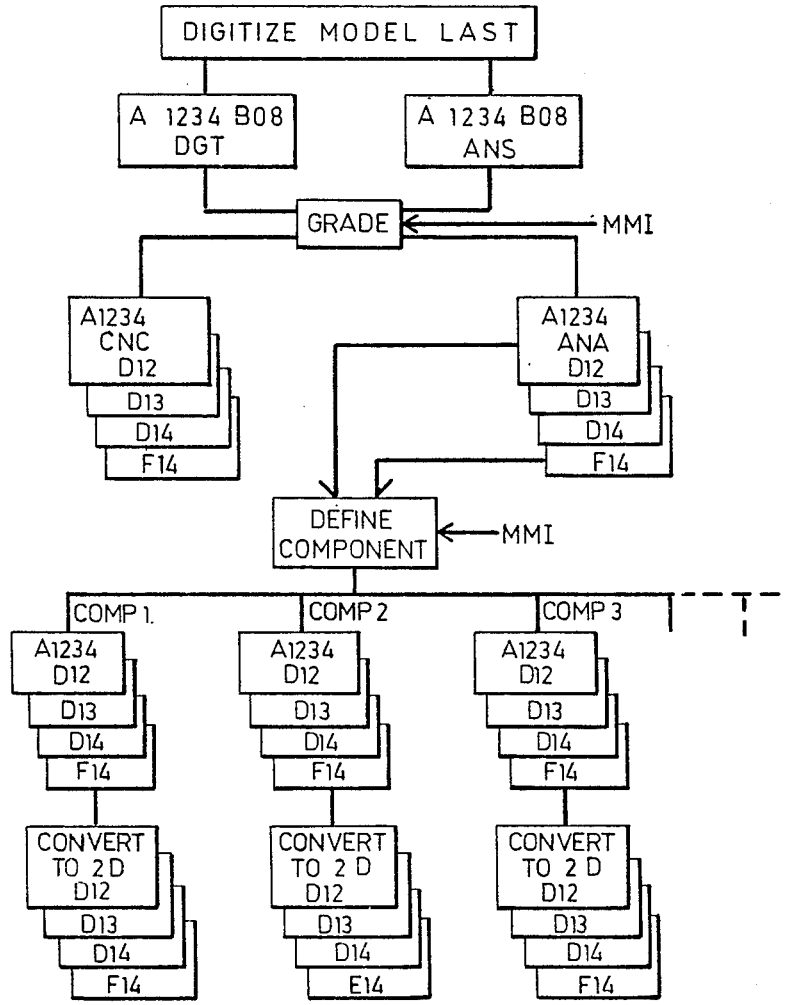

METHOD AND APPARATUS FOR MAKING SHOE LASTS AND/OR SHOE COMPONENTS

BACKGROUND OF THE INVENTION

The present invention relates to a method and to an apparatus for making shoe lasts and/or components for shoes.

A shoe last is a block or form shaped like a human foot used in manufacturing shoes and also in repairing shoes. In the manufacture of shoes, a model last is produced for each particular shoe last style, and then a plurality of graded lasts are produced according to the different lengths and widths to be made available for the respective shoe style.

The grading procedure is usually not a straightforward one wherein all dimensions are proportionately increased with the increase in size; rather, to avoid distortions, and also to minimize the initial tooling costs (e.g., moulds) required to manufacture the shoe components, many dimensions are not increased, or are disproportionately increased, for a plurality of grades. For example, "bottom-holding", "heel-height holding", "toe-spring holding", and "toe-thickness holding" techniques are frequently used in order to maintain certain dimensions for a plurality of sizes, or to change the dimensions in a non-linear manner with respect to the different sizes.

An important factor of the respective syle influencing the grading procedure is the feather line of the model last, namely the juncture line of the last bottom with the last sides. The feather line determines the outer configuration of the last bottom and is frequently involved in these "holding" techniques.

Generally speaking, producing graded lasts from a model last not only requires a high degree of expertise and experience, but also is very expensive and time-consuming. According to present techniques, a model last for each style is first produced by an artisan model-maker, and then the graded lasts, corresponding to the different sizes of the same basic style, are usually prepared by a pantograph machine, in which the different sizes are produced by adjusting the arms of the pantograph. However, this method produces considerable distortions which are cumulative; that is, a distortion from one size to the next may not be too significant, but they become very significant when they are magnified by differences in three or four sizes. These distortions therefore require considerable "retouching" by the last maker; moreover, they limit the variations possible as a practical matter in the different grades.

The components (e.g., the flat leather, plastic, fabric blanks for making the sides, soles, heels, etc.) used in manufacturing the shoe are uusually indicated by style-lines marked on the model last. These style-lines also indicate the stitching lines of the various components used in the manufacture of the shoes, and thereby the configurations of such components. Techniques are known for converting the three-dimensional configuration of a shoe component, as determined by three or more style-lines on the shoe last, to a two-dimensional configuration for manufacturing the respective components. However, determining the three-dimensional configuration of the components in all the grades (sizes) of the respective shoe style is also very time-consuming and requires a high degree of expertise and experience.

BRIEF SUMMARY OF THE INVENTION

An object of the present invention is to provide a novel method and apparatus for making shoe lasts having advantages in the above respects. Another object of the invention is to provide a novel method and apparatus which may be also used for making the graded components of the shoes.

According to the present invention, there is provided a method of making shoe lasts, comprising: digitizing a large number of sample points on the outer surface of a model last representing a particular shoe style to produce a model last digital file representing the three-dimensional surface contour of the respective model last; grading the model last digital file to produce graded last digital files representing different last sizes of the respective shoe style; and utilizing the graded last digital files to produce graded shoe lasts of the respective shoe style.

According to an important feature in the preferred embodiments of the invention described below, the method includes the further steps of digitizing a large number of sample points on the feather line of the model last to produce a feather line digital file representing the feather line of the respective model last; and utilizing the feather line digital file, together with the model last digital file, for producing the plurality of graded last digital files of the respective shoe style.

The described preferred embodiments also include the further step of digitizing a large number of sample points on preselected style-lines of the model last to produce a style-line digital file for the respective shoe style. Such a style-line digital file may be used, together with the model last digital file, for producing a plurality of graded component digital files representing different sizes and configurations of the components e.g., the flat leather blanks, used in manufacturing the respective shoe style.

The invention also provides apparatus for use in making shoe lasts, comprising: rotary drive means for rotating a model last representing a particular shoe style; digitizing means for digitizing a large number of sample points on the outer surface of the model last to produce a model last digital file representing the three-dimensional surface contour of the respective model last; and grading means for producing from the model last digital file a plurality of graded last digital files representing different lengths and widths of lasts of the respective shoe style.

In one preferred embodiment described below, the digitizing means comprises a tracer probe in the form of a rotary wheel; rotary drive means for rotating the model last about its longitudinal axis, constituting a first axis; a first encoder producing an electrical output representing the instantaneous angular position (e.g., "$\theta$") of the model last about the first axis; a spring urging the tracer probe along a second axis in contact with the outer surface of the model last as the model last is rotated by the rotary drive means about the first axis; a second encoder producing an electrical output representing the instantaneous position (e.g., "X") of the tracer probe along the second axis; linear drive means for driving the tracer probe along a third axis parallel to the first axis; and a third encoder producing an electrical output representing the instantaneous linear position (e.g., "Z") of the tracer probe along the third axis.

In this described embodiment, the digitizing operation measures the instantaneous position (X, $\theta$, Z) of the tracer probe at each sample point to represent the "tool" path points (i.e., the center point of the tracer wheel) on the three-dimensional surface contour of the respective model last; and the grading operation converts the tool path points to "part" points on the surface of the model last, grades the part points to represent different lengths and widths of lasts of the respective shoe style, and then reconverts the graded part points to tool path points in the graded digital files.

In a second described embodiment, the digitizing means comprises an optical device directing an optical beam, such as a laser beam, against the outer surface of the model last as the model last is rotated about its longitudinal axis, and as the optical beam is advanced parallel to the longitudinal axis of the model last. In this described embodiment, the digitizing operation directly measures the part points on the surface of the model last; and the grading operation grades the part points to represent different lengths and widths of lasts of the respective shoe style, and then converts the graded part points to tool path points in the graded digital files.

As will be described more particularly below, the novel method and apparatus may be used for making graded shoe lasts, and also graded components of shoes, in a quick and efficient manner as compared to the present techniques. Moreover, the method and apparatus of the present invention permits various "holding" techniques to be conveniently applied in order to hold a particular dimension of the shoe last for more than one grade, or to provide a disproportionate change in one or more dimensions with respect to the other dimensions among different grades. Such techniques may be used to avoid distortions in the graded shoes, and also to minimize the initial tooling required to make the shoe components.

The method and apparatus may be embodied in new equipment specifically designed for making shoe lasts or components in accordance with the invention, or may be added to existing equipment, e.g., of the pantographic type, to retrofit such equipment for making graded shoe lasts in accordance with the present invention.

Further features and advantages of the invention will be apparent from the description below.

BRIEF DESCRIPTION OF THE DRAWINGS

The invention is herein described, by way of example only, with reference to the accompanying drawings, wherein:

FIG. 5 is a block diagram illustrating the digitizer computer in the system of FIG. 1;

FIG. 6 is a flow diagram illustrating the man-machine interface (MMI) software in the digitizer computer of FIG. 1;

FIG. 7 is a flow diagram illustrating the operation of the digitizer computer of FIG. 1;

FIG. 8 is a flow diagram illustrating the man-machine interface (MMI) software in the grading computer of FIG. 1;

FIG. 9 is a flow diagram illustrating the operation of the grading computer in the system of FIG. 1;

FIG. 12 is a flow diagram illustrating the application of a "bottom holding" technique in producing a graded last;

FIG. 13 is a last diagram helpful in explaining the heel-height holding technique;

FIG. 14 is a flow diagram explaining the heel-height holding technique applied to the last illustrated in FIG. 13;

FIG. 16a illustrates a last having a number of style-lines marked thereon to indicate the configurations of different components used in manufacturing the shoe corresponding to the last;

FIG. 16b is a flow diagram illustrating the manner of using the style-lines in FIG. 16a for producing the graded components used to manufacture the shoes of the graded lasts;

DESCRIPTION OF PREFERRED EMBODIMENTS

Figure 1:
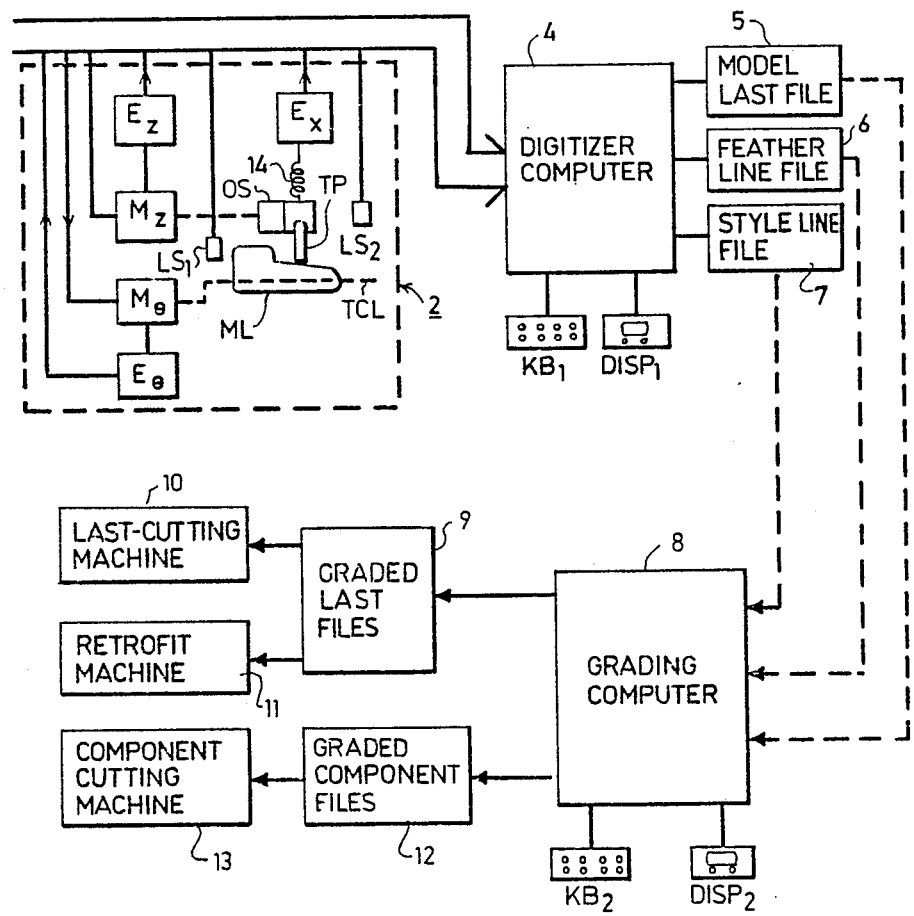
FIG. 1 is a block diagram illustrating one form of apparatus constructed in accordance with the present invention for making shoe lasts and/or shoe components.

Overall System Illustrated in FIG. 1

FIG. 1 is a block diagram illustrating an overall system for making shoe lasts in accordance with the present invention. The system includes a digitizer, within the block generally designated 2, which digitizes a large number of sample points on the outer surface of a model last ML representing a particular shoe last style. This digital information is outputted to a digital computer 4 which produces a model last digital file 5 representing the three-dimensional surface contour of the respective model last.

Figure 2:
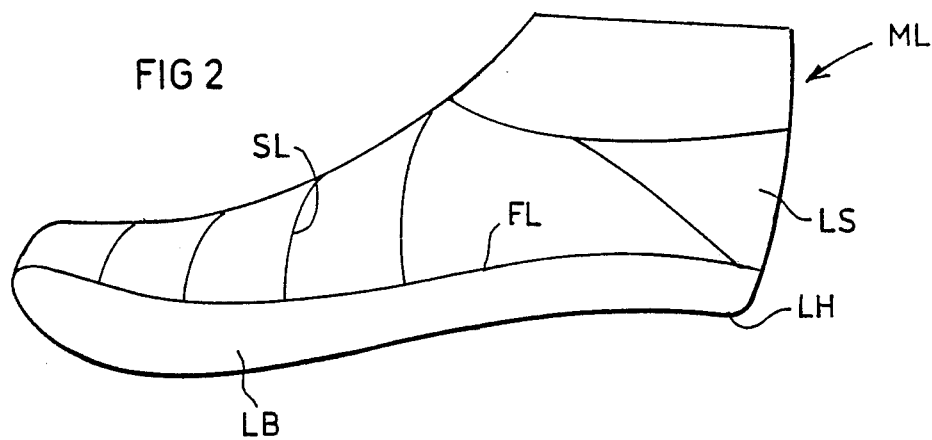
FIG. 2 illustrates a typical model last representing a particular shoe style used for producing graded lasts for the different sizes of the respective shoe style.

FIG. 2 illustrates one form of model last ML representing a particular shoe style. Among its other components, the illustrated model last ML includes a last bottom LB, a last heel LH, and last sides LS. The juncture line of the last sides LS with the last bottom LB and last heel LH is called the feather line FL, and is an important element in the shoe style of the respective last. As also seen in FIG. 2, the last sides LS include a plurality of style-lines SL, which are important elements not only in the particular shoe style of the respective last, but also in the configuration of the components, e.g., leather blanks, used in making the shoe of the respective style.

Digitizer unit 2 illustrated in the system of FIG. 1 digitizes not only the sample points on the outer surface of the model last ML to produce the model last digital file 5, but also digitizes the feather line FL of the model last, which information is outputted to the digitizer computer 4 to produce a feather line digital file 6. Digitizer 2 also digitizes the style-lines SL of the model lasts ML, which information is also outputted to the digitizer computer 4 to produce a style-line digital file 7. Since the feather line file 6 and the style-line file 7 are substantially smaller than the model last file 5, files 6 and 7 may be integrated into a single joint file, and thereafter processed as a single file with the model last file 5. These files may be embodied in diskettes, cassette tapes, or in any other suitable form.

As further shown in FIG. 1, the digitizer file 5, feather line file 6, and style-line file 7, are inputted into a grading computer 8 which produces a plurality of graded last digital files. These may also be embodied in the form of diskettes or cassette tapes suitable for use in a CNC (computerized numerical control) last cutting machine, indicated at 10, which uses this information for cutting the plurality of graded lasts for each shoe style represented by the model last ML. The graded last files 9 may also be used in an existing last-cutting machine (e.g., of the known pantographic type) retrofitted, as indicated at 11, so as to receive the graded last files 9 and to use this information for cutting the graded lasts.

The grading computer 8 may also produce a plurality of graded component files 12 for the components, e.g., leather blanks, used for making the shoes in the various grades of the particular shoe style of the model last ML. The graded component files 12, also in the form of diskettes or cassette tapes for example, may be inputted into existing component cutting machines, indicated at 13, for cutting the graded components to be used for making the shoes.

The digitizer computer 4 includes a keyboard $KB_1$ and a display $DISP_1$ enabling operator control of the computer to produce the three files, 5, 6 and 7, as will be described more particularly below. Similarly, the grading computer 8 also includes a keyboard $KB_2$ and a display $DISP_2$ enabling operator control of the computer to produce the files 9 and 12, as will also be described more particularly below.

The Digitizer Unit 2

Figure 3:
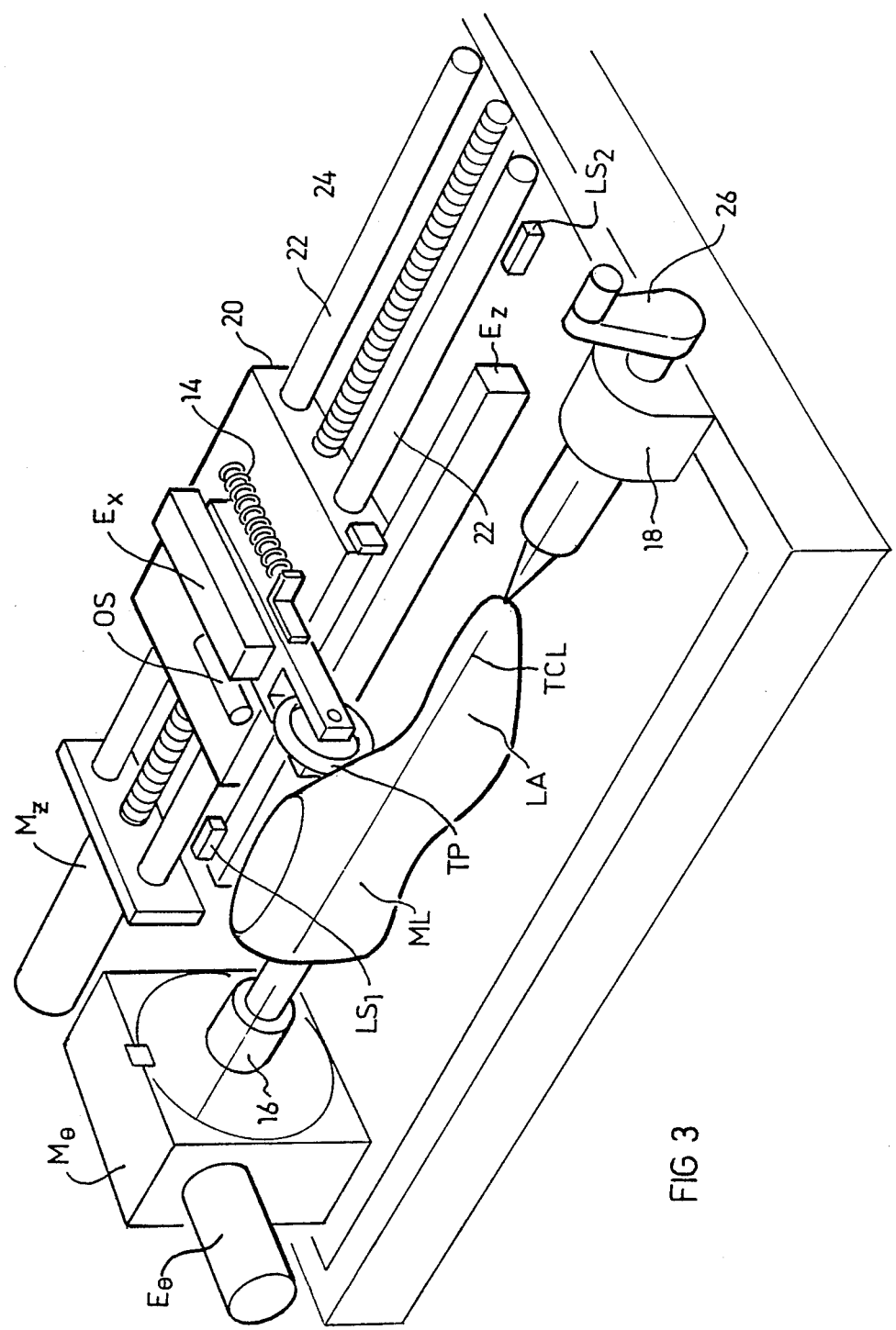
FIG. 3 illustrates the digitizing means included in the apparatus of FIG. 1.

FIG. 1 illustrates in block diagram form the electrical system included in the digitizer unit 2; FIG. 3 illustrates the mechanical construction of the digitizer unit 2; and FIG. 4 illustrates the digital coordinates (X, $\theta$, Z) of each of the sample points on the outer surface of the model last which are measured by the digitizer unit 2 to produce the model last digital file 5 as well as the feather line file 6 and style-line file 7.

As shown in FIG. 1, digitizer unit 2 includes a rotary motor $M_{74}$ for rotating the model last ML about its longitudinal axis, hereinafter referred to as the turning center line TCL, and an encoder $E_\theta$ producing an electrical output representing the instantaneous angular position ($\theta$) of the model last ML about line TCL. The digitizer unit further includes a tracer probe TP urged by a spring 14 along a second axis (X-axis) into contact with the outer surface of the model last ML as the model last is rotated about its turning center line TCL, and an encloder $E_X$ producing an electrical output representing the instantaenous position of the tracer probe along the X-axis. Digitizer unit 2 further includes a motor $M_Z$ for driving the tracer probe TP along a third axis (the Z-axis), parallel to the turning center line TCL of the model last ML, and an encoder $E_Z$ producing an electrical output representing the instantaneous linear position of the tracer probe TP along the Z-axis.

Figure 4:
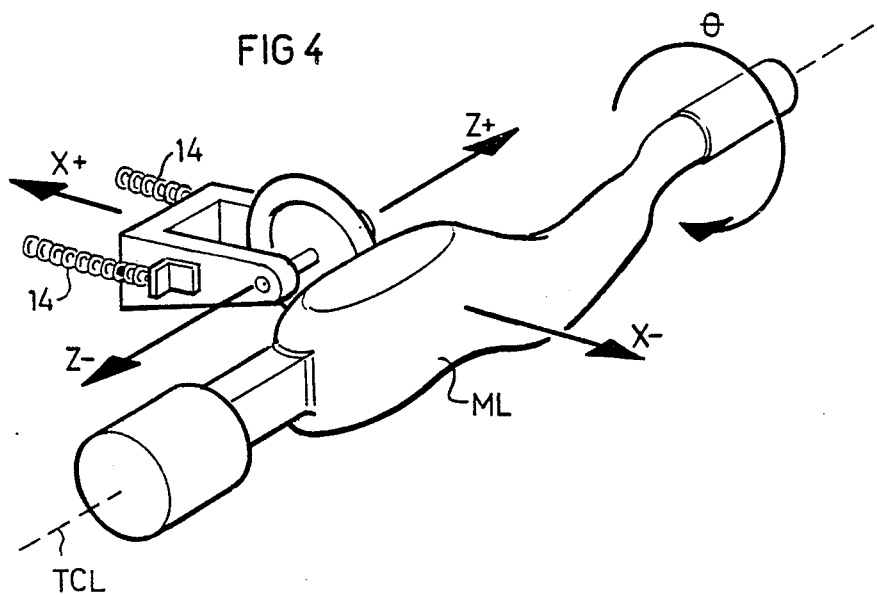
FIG. 4 is a three-dimensional view illustrating the three axes defining the sample points on the outer surface of the model last.

As shown in FIGS. 4 and 4a, each point in space is defined, in each plane, by polar coordinates, namely by the dimension "X", being the instantaneous linear position of the center of the tracer probe TP along the X-axis, and the angle $\theta$, being the instantaneous angular position of the last about the turning center line TCL; and each plane is defined by the instantaneous linear position of the tracer probe TP along the Z-axis. The center points of the tracer probe thus represent the "tool" path points (points "T" in FIG. 10a). Since the diameter of the tracer probe TP is known, the position in space of the surface contact point on the outer contour of the last (referred to as the "part" points in FIG. 10a) can be easily determined.

Encoders $E_X$, $E_\theta$ and $E_Z$ may be digital-type encoders of known construction which output a series of digital pulses representing their respective instantaneous values; alternatively, the encoders could be of the analog type, in which case the analog information outputted by them would be converted to digital form by an analog-to-digital converter, as also known. As described above, the digital information from the encoders $E_X$, $E_\theta$ and $E_Z$ is inputted into the digitizer computer 4 for producing the respective digitizer file 5, feather line file 6, and style-line file 7, under the control of the operator via keyboard $KB_1$ and display $DISP_1$.

The mechanical construction of the digitizer unit 2 is more particularly illustrated in FIG. 3. The tracer probe TP is in the form of a wheel which is urged by loading spring 14 (a second one, not shown, being provided on the opposite side of the wheel) into contact with the outer surface of the model last ML. The model last is secured between a heel dog 16 and a tail stock 18, and is rotated by electrical servomotor $M_\theta$ about the longitudinal axis TCL. The tracer probe wheel TP, and its loading spring(s) 14, are carried by a carriage 20 movable along a pair of rails 22 parallel to the longitudinal axis TCL of the model last ML by means of a ball screw 24 rotated by the servomotor $M_Z$. Thus, by operating motor $M_\theta$ to rotate the model last ML about its longitudinal axis TCL and by operating motor $M_Z$ to drive the tracer probe wheel TP along the Z-axis, parallel to the longitudinal axis TCL of the model last, the tracer probe wheel TP scans the complete outer surface of the model last.

During the scanning operation, the instantaneous position of the tracer probe TP on the outer surface of the model last ML, as measured by the respective encoders $E_X$, $E_\theta$ and $E_Z$, is periodically recorded. This data thus identifies the sample points on the outer surface of the model last representing the particular shoe style of the last. A large number of sample points, e.g., in the order of 15,000, is required for this purpose; for example, 90 sample points may be taken for each plane or slice, and 100–200 slices may be taken, depending on the model last. However, since the sample points are taken "on the fly" during the continuous rotation of the model last ML, the complete digitizing procedure may be done in only a few minutes, whereas automatic point-to-point sampling of the outer surface of the last would take many hours.

During this digitizing procedure, rotary motor $M_\theta$, which rotates last ML, is operated continuously. Servomotor $M_Z$ may also be operated continuously to move the tracer probe wheel TP along the Z-axis, in which case the scanning of the outer surface of last ML by the tracer probe TP would be in a spiral manner. Alternatively, servomotor $M_Z$ may be operated intermittently, following each rotation of the model last ML by the servomotor $M_\theta$, in which case the scanning of the outer surface of the model last by the tracer probe TP would be in a stepped manner.

Digitizer unit 2 illustrated in FIG. 3 further includes two limit switches $LS_1$, $LS_2$, at the opposite ends of the model last ML and engageable by elements carried by carriage 20. Switches $LS_1$, $LS_2$ limit the linear movement of the carriage along the Z-axis.

Carriage 20 further includes an optical sensor OS used for sensing the style-lines SL (FIG. 2) of the model last ML. For this purpose, the style-lines SL on the model last ML have a different optical characteristic from the remainder of the model last ML; for example, the model last could be of a light color, and the style-lines SL could be of a dark color.

Optical sensor OS may also be used for sensing the feather line FL of the model last ML. Preferably, however, the feather line FL is sensed by the tracer probe TP. For this purpose, the model last ML is of electrically insulating material except for the last bottom LB (FIG. 2), which is of electrically conductive material. Thus, the juncture line between the last bottom LB and the last sides LS, constituting the feather line FL of the last, is detectable by the electrically-conductive tracer probe TP.

The digitizer unit illustrated in FIG. 3 further includes a handle 26 carried by the tail stock 18 to enable manual attachment and detachment of the model last ML.

The Digitizer Computer 4

Digitizer computer 4 in the system of FIG. 1 is more particularly illustrated in FIG. 5; its main machine interface (MMI) software is illustrated in the flow diagram of FIG. 6; and its overall operation is illustrated in the flow diagram of FIG. 7.

With reference first to FIG. 5, it will be seen that the digitizer computer 4 includes three axes controllers, namely $AC_X$ for the X-axis, $AC_\theta$ for the angular position $\theta$ about the turning center line TCL, and $AC_Z$ for the Z-axis. As one example, each of the three illustrated controllers may be an Intelligent Axis Card (IAC) in the Anomatic III CNC controller produced by Anorad Corporation of Hauppauge, N.Y. Such controllers are well-known and are commercially available.

Axis controller $AC_\theta$ controls rotary motor $M_\theta$ its motor drive unit $MD_{74}$ and receives the instantaneous angular position of the tracer probe TP via encoder $E_\theta$; and axis controller $AC_Z$ controls linear motor $M_Z$ via its motor drive unit $MD_Z$, and receives the instantaneous linear position of the tracer probe TP along the Z-axis via excoder $E_Z$. Tracer probe TP is moved along the X-axis by spring(s) 14, and axis controller $AC_X$ receives the instantaneous linear position along the X-axis via encoder $E_X$. The two controllers $AC_Z$ and $AC_\theta$ also receive information from the two limit switches $LS_1$, $LS_2$.

The information from the three controllers is transmitted to the central processor unit CPU via busses 30 and 32. Central processor unit CPU may be an 8088 processor, including an optional 8087 co-processor, and bus 30 may be an RS 422 bus, all as included in the Anomatic III CNC controller.

The digitizer computer illustrated in FIG. 5 further includes a servo co-processor 34, which periodically (e.g., every 4° of angular movement of the model last ML, to provide 90 sample points for each plane or slice) collects data from the X-axis controller $AC_X$ and the $\theta$-axis controller $AC_\theta$, and places this information in a buffer for transfer to the central processor unit CPU when ready.

The central processor unit CPU also receives information from a sensor unit 36, which senses the feather line FL and the style-lines SL on the model last. As described above, the tracer probe TP may be used for sensing the feather line FL if the last bottom LB (FIG. 2) is of electrically-conductive material, and the last side LS is of insulating material, in which case the tracer probe TP would be of electrically-conductive material; alternatively, the optical sensor OS in the digitizer unit illustrated in FIG. 3 may be used not only for sensing the optically-sensible style-lines SL, but also the feather line FL. When sensor 36 senses a point on the feather FL or style-line SL, it interrupts the information supplied to the central processor unit CPU and stores the coordinate positions for ultimate transfer to the respective feather line file 6 or style-line file 7.

The central processor unit CPU is controlled by a program recorded in a hard disk 38 and inputted via input bus 40. The digitized data from the central processor unit CPU is outputted via bus 40 and recorded in diskettes 42 in a manner to be subsequently used in the grading computer 8 (FIG. 1) for producing the graded files.

The digitizer computer 4 illustrated in FIG. 5 further includes a graphic axis emulator 46, which continuously displays the X, $\theta$, Z positions of the digitizer in real time. Computer 4 further includes a Real Time Graphic Integrator 48, and an I/O master base board 49 which, controlled by the program inputted by the hard disk 38, performs a number of functions, including withdrawing the tracer probe TP, stopping the operation of the machine under the control of the limit switches $LS_1$, $LS_2$, and also giving an alarm should one of the limit switches $LS_1$, $LS_2$ be actuated.

The central processor unit CPU is also connected by bus 40 to other input/output devices, e.g., a printer 50 via bus 52, and also via bus 54 to a serial communication link 56 for transmission to remote locations. Line 56, for example, may transmit the digitized model last data by telephone or wire to a last-manufacturing location from the model-last digitizing location.

The operation of the central processor unit CPU can be controlled by man-machine interface software via keyboard $KB_1$ and display $DISP_1$. By means of this interface, the operator inputs via keyboard $KB_1$ special information to control the digitizing operation, e.g., information identifying the name of the last file, the total length of the last file, the pitch of the scanning spiral, the number of points to pick up per turn, the starting point of digitizing (starting from the heel), and the "heel back" length (in case the pitch is to be reduced at the back of the heel). The MMI software questions to the operator, and the information inpulled by the operator in response thereto, can be viewed via display DISP$_1$.

FIG. 6 is a flow diagram illustrating the man-machine interface software for the digitizing computer 4.

Thus, the operator, after pressing "on", enters the file name. For example, the file name may contain eight alphanumeric characters and three extension characters. The first five charcters designate the style identification (e.g., A1532); the next three characters designate the size (e.g., B 08); and the three extension characters identify the type of data, e.g., "DGT" identifying a digitizer file, "ANS" identifying a feather line or style-line file, and "CNC" identifying a produced "CNC" file.

Following the entry of the file name, the operator enters the number of points for each turn of the model last; for example, the operator may enter 90 points for each turn.

The operator then enters the pitch length, namely the advance along the Z-axis per rotation, and the Last Length, namely the total length of the last.

The operator is then requested by the program to enter the following further data:

(a) Starting back, namely how far back from the first sample point of the last; if no value is entered by the operator, the program automatically enters "10".

(b) Heel length, namely what length of heel for which to use the finer (e.g., one-half) heel pitch; if no value is introduced by the operator, the program automatically enters "20 mm".

(c) Digitation speed, namely the mm/second; if no answer is entered by the operator, the program automatically enters "255 mm/sec".

(d) Active sensor, namely whether the optical sensor for sensing the style-line and/or the feather line sensor for sensing the feather line is to be active; if no answer is entered by the operator, the program automatically enters "Yes", indicating that both sensor are to be active.

After all the foregoing information is entered, the operator then presses "Go"

Reference is now made to the flow diagram of FIG. 7 illustrating the operation of the digitizer computer 4 in FIG. 1. The axes controllers AC$_X$, AC$_\theta$, AC$_Z$, are strobed every 4$^0$ (in this particular example), and the positions of the rotary encoder E$_\theta$ and the linear encoder E$_X$ are transferred via busses 30, 32 (FIG. 5) to the CPU. This positional data is collected in the CPU and is stored in its memory buffer in binary form. Thus, the memory buffer in the CPU continuously stores the instantaneous angular position ($\theta$) of the model ML about the turning center line TCL of the last as detected by the rotary encoder E$_\theta$, and also the instantaneous linear position (X) of the tracer probe TP along the X-axis, as detected by the linear encoder E$_X$.

The instantaneous positions of the tracer probe TP along the Z-axis, as detected by the linear encoder E$_Z$, is also read into the CPU and stored in its buffer memory. As indicated earlier, linear motor M$_Z$ which drives the tracer probe TP along the Z-axis (along rails 22 in FIG. 3), may be operated either continuously (wherein a spiral scan is produced by the tracer probe about the model last ML), or intermittently (wherein a stepped scan is produced).

The positional data stored in the memory buffer of the CPU includes not only the spacial locations of the sample points on the outer surface of the model last ML, but also the spacial locations of the feather line FL (FIG. 2) and of the style-lines SL. As described earlier, the feather line FL is detected by the tracer probe TP by making the tracer probe and the last bottom LB of electrically-conductive material, while the last sides LS are made of electrically-insulating material; and the style-lines SL are detected by the optical sensor OS (FIG. 3) carried by the carriage 20 which also carries the tracer probe TP.

For purposes of example, about 15,000 sample points on the outer surface of the model last ML are recorded to define the outer contour of the model last for the respective shoe style, and also the featherline FL and style-lines SL of the respective model last. In the described preferred embodiment, 90 sample points are recorded for each plane or "slice" of the model last ML, and from 100 to 200 (e.g., 167) slices may be recorded, depending on the length of the model last. Accordingly, the memory buffer in the CPU has a capacity of 15,000 sample points.

At the end of each rotation of the model last, corresponding to one increment of movement along the Z-axis, a check is made as to whether the memory buffer is full. If the buffer is not full, a check is made to determine whether the end of the last has been scanned; if not, the rotary motor M$_\theta$ is continued to operate to rotate the model last another turn. If, however, it has been determined that the end of the last has been scanned, the data in the memory buffer is transferred to the hard disk (38, FIG. 5), and the memory buffer is cleared. The data stored in the hard disk may thereafter be transferred to the diskette 42 for further processing in the grading computer 8 of FIG. 1.

As shown in FIG. 1 the digitizer computer 4 produces a model last file 5 representing the sample points on the three-dimensional surface contour of the respective model last; a feather line file 6 representing the sampled points on the feather line FL of the model last; and a style-line file 7 representing the sampled points on the style-lines SL of the model last. The model last file 5 is recorded in one diskette, but since the feather line file 6 and style-line file 7 are both relatively small, these two files are recorded in a single other diskette.

The diskettes including the three files 5, 6, and 7 may thereafter be inputted into the grading computer 8 (FIG. 1) to produce the graded last files 9 representing the different sizes of lasts for the respective shoe style, and/or the graded component files 12 representing the different sizes of the components, such as leather blanks, actually used in manufacturing the shoes for the respective style.

As one example, the digitizer computer 4 may be the previously-mentioned Anomatic III CNC computer produced by Anorad Corporation of Hauppauge, N.Y. Such computers are well-known and are commercially available, including technical data enabling them to be programmed to perform the above operations. Therefore, further details of the construction and operation of the computer, and the software for performing the above-described operations, are not set forth herein.

The Grading Computer 8

Grading computer 8 may be one of the commercially-available general-purpose personal computers, such as the IBM PC. As shown in FIG. 1, it includes a keyboard KB$_2$ and a display DISP$_2$ for the man-machine interface (MMI) software to control the grading operations. Since such computers are wellknown, further details of its construction are not set forth herein. FIG. 8 is a flow diagram illustrating the MMI (man-machine interface) software for the grading computer 8 of FIG. 1; FIG. 9 is a flow diagram illustrating the operation of the grading computer; and FIGS. 10a–15b are diagrams helpful in explaining the grading operation.

With reference first to FIG. 8 illustrating the MMI interface software involved in controlling the grading operations performed by computer 8, the operator uses keyboard KB$_2$ and display DISP$_2$ to enter the file name. This includes the same eleven alphanumeric characters used for designating the file in the digitizing operations, i.e., the style name (five characters), grade of last (three characters), and special designations (three characters).

Next, the operator introduces the pitch required. This may be the same pitch as entered into the digitizer computer 4 for producing the model last file, or it may be a different pitch. However, whereas either a spiral scan or an intermittent scan could be used in the digitizing operation controlled by the digitizer computer 4 for producing the model last file, when producing the graded last file in the grading computer the scanning must be a spiral scann to avoid abrupt changes when cutting the last.

Next introduced into the grading computer 8 is the length of the model last. This may be the same or different than the one used in the digitizer computer 4 for producing the model last file. In the digitizing operation, the longitudinal axis of the last is usually used as the model length, whereas in the grading operation, the length of the bottom pattern is usually used as the model length.

Next introduced are the girth of the model and the bottom width of the model, both of which are measured according to standard procedures.

After introducing the above information, the computer asks the operator "do you want grading? ". If the operator (via the keyboard KB$_2$) answers "no", the MMI program ends; however, if the answer is "yes", the oplerator is then asked "do you want standard ?". If the answer is "yes", the operator is asked to input the standard required, the size of last required, and the size of bottom required; the rest of the information is supplied from standard known data. If, however, a "standard" grading is not desired, the computer then asks the operator for specific information concerning the "special" requirements, including the required size of last, length of last, girth of last, and bottom width.

This completes the information required for the specific grade desired, and the operator is then asked "do you want another grade?". If yes, the program returns to the point in the flow chart wherein the operator is again asked whether a standard or a special grade is desired. Whenever another grade is not desired, the data-inputting phase is completed.

It will thus be seen that the operator can input data for any desired number of grades desired to be produced, depending upon the memory capacity of the grading computer 8.

Figure 10A:
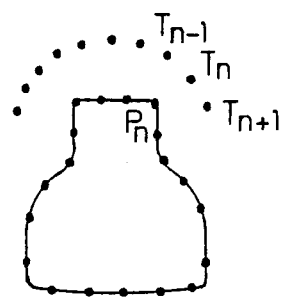
FIGS. 10a and 10b are diagrams helpful in explaining the manner of determining the part points i.e., the points on the surface of the model last, from the measured tool path points.
Figure 10B:
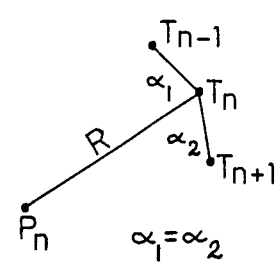

The operation of the grading computer 8 is more particularly shown in the flow diagram of FIG. 9, taken together with the diagrams of FIGS. 10a and 10b.

Thus, for each digitized tool path point T in the model last file 5 produced by the digitizer computer 4 (these being the center points of the tracer probe TP as described above), there is produced a part contact point P. FIG. 10a illustrates a number of the tool path points $T_1$———$T_{n+1}$, and the corresponding part contact points $P_1$———$P_n$. The calculation of the part contact points $P_1$———$P_n$ is effected in the following manner.

As shown in FIG. 10b, for each tool-path point $T_n$, a first line is connected from $T_n$ to $T_{n-1}$, and a second line is connected from $T_n$ to $T_{n+1}$. The angle between the two lines is then equally divided ($\alpha_1 = \alpha_2$) by a line "R" (the tool radius); the end of line "R" determines the part surface point $P_n$ in the respective two dimensional plane. For the third dimension, the procedure is repeated along a second right-angle axis wherein $T_n$ is the apex of a pyramid.

The next operation in the flow diagram illustrated in FIG. 9 is to detect the data of the feather line FL (FIG. 2). As described earlier, this data was originally obtained in the digitizing operation (using computer 4) by making both the tracer probe TP and the last bottom LB of electrically conductive material, and the last size LS of electrically-insulating material, so that the juncture line between the last bottom and last sides, constituting the feather line FL, was detected by the conductive tracer probe TP and recorded in the feather line file 6. The feather line FL data in file 6 may thus be used in the actual grading operations, as described more particularly below.

After the grading operation has been performed, the computer then recalculates the graded tool path points (T), based on the known dimensions of the tool to be used for cutting the last.

The next operation is to make the required kinematic calculations to assure that the machine tool controlled by the graded last file does not exceed predetermined acceleration block process time, and axis-speed constraints. This is a well-known technique, wherein the magnitude and direction of the movement of the cutting tool are resolved into its vector components, and the vector components are controlled so as not to exceed the predetermined acceleration constraints. If one of these constraints is exceeded, the computer program shifts to the next point by interpolation and it then again makes the kinematic calculations, the process being repeated until the acceleration constraint is not exceeded, as well-known in such kinetic calculations.

When the acceleration constraints are not exceeded for the graded tool path points, the information is stored in a CNC file, e.g., a diskette or cassette tape, and thereby constitutes one of the graded last files 9 in FIG. 1, ready for use with a last-cutting machine 10 or a retrofit machine 11.

The Grading Operation

The grading operation is performed on the data of the part contact points ($P_1$———$P_N$) before converting this data to the tool-path points ($T_1$———$T_N$) in the flow diagram of FIG. 9. For each angular position (O), the grading operation converts the X-axis and the Z-axis coordinates of each sample point on the model last to the corresponding coordinates on the graded last to be produced. Briefly, this is done by first determining the grading coefficients of length, girth, and width, corresponding to the relationship of these parameters between the model last and the desired graded last, and then multiplying the sample point coordinates of the model last by the respective coefficients, as will be described more particularly below.

However, a straightforward grading in this manner will produce a proportionate increase or decrease for all the sample points. This is usually not desirable because it of consumer preference, and also because this would require separate manufacturing tooling for each shoe component for each grade. Thus, it is frequently desirable that a larger size last will not have a heel-height, toe-spring, and/or toe-thickness increased in the same proportion as the length and width of the last of another grade. For example, whereas the shoe length and width may increase in the same proportion in the larger sizes, the consumer usually prefers a smaller proportionate increase in the heel height. In addition, it is frequently desirable that the last bottom have the same dimension for more than one grade, in order to reduce the tooling costs that would be involved in producing separate tooling (e.g., moulds) for manufacturing a different bottom sole for each shoe grade.

Figure 11A:
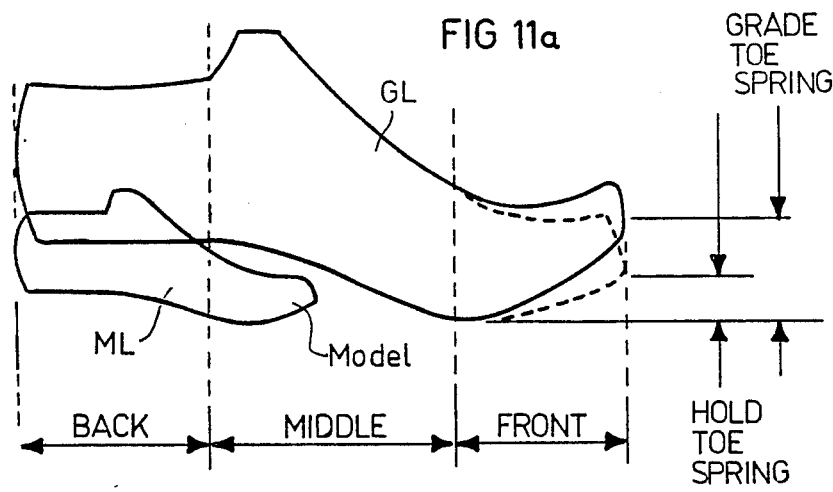
FIG. 11a illustrates a model last and one graded last produced therefrom, including different part of such lasts, and also illustrates the manner of modifying the change in one of the dimensions (i.e., toe spring) in the produced graded last to avoid distortions.
Figure 11B:
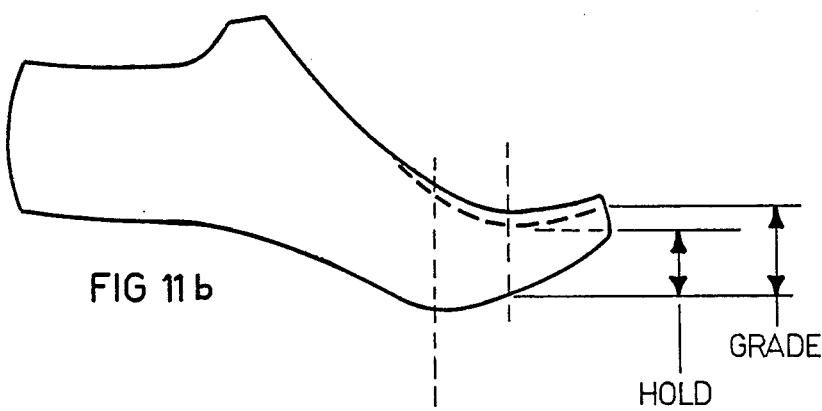
FIGS. 11b and 11c are diagrams illustrating, in full lines, lasts which have been graded proportionately, and in broken lines the modifications of the graded lasts in order to apply other "holding" techniques for avoiding distortions for minimizing initial tooling costs.
Figure 11C:
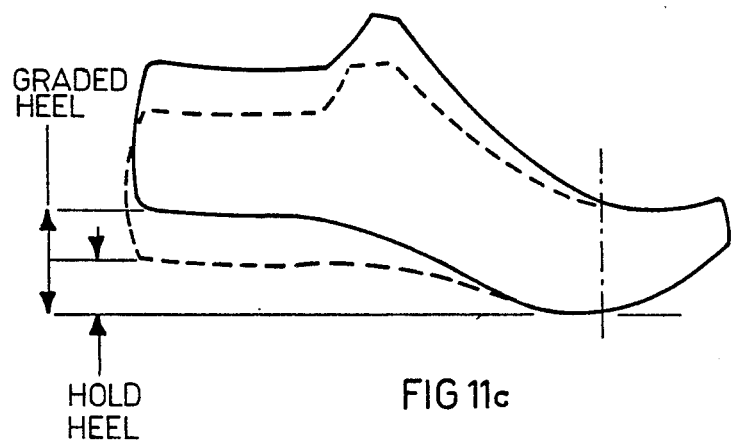

The described method and apparatus for grading the lasts not only enable different coefficients to be applied to different portions of the lasts, (e.g., to increase the resolution at critical portions such as the back of the heel), but also enable various "holding" techniques to be applied to adapt the shoe dimensions to consumer preference and also to minimize tooling costs. FIGS. 11a–11c illustrate a number of such holding techniques.

Thus, FIG. 11a illustrates a model last ML, and also one of a plurality of graded lasts GL to be produced from the model last. The "back", "middle" and "front" parts of the graded last are also indicated. If a straight-forward grading operation was performed, the front part of the graded last would have the "toe-spring" shown in full lines in FIG. 11a, which would not be desirable. Accordingly, a "toe-spring" holding technique is applied during the grading operation to "hold" the toe-spring to that shown in broken lines. FIGS. 11b and 11c illustrate other holding techniques, e.g., "toe-thickness" and "heel-height", that may be applied also to produce a disproportionate increase (or decrease) in the toe-thickness and heel-height in the graded lasts.

FIG. 12 is a flow diagram illustrating the grading operation. The first step is to determine the grading coefficients, KL, KR and KRB, wherein:

(1) KL is the length coefficient and is equal to the length of the last after grading ($L_G$) divided by the length of the model last before grading ($L_M$) (i.e., $KL = L_G/L_M$);

(2) KR is the girth coefficient and is equal to the girth of the last after grading ($G_G$) divided by the girth of the model last before grading ($G_M$) (i.e., $KR = G_G/G_M$); and (3) KRB is the bottom coefficient and is equal to the width of the last after grading ($W_G$) divided by the width of the model last before grading ($W_M$) (i.e., $KRB = W_G/W_M$).

These calculations are made from the data manually inputted into the computer according to the man-machine interface flow (MMI) diagram illustrated in FIG. 8.

According to the flow chart illustrated in FIG. 12, the computer then finds each sample point (e.g., 15,000 sample points) of the digitized model last, and sets a flag for each such sample point which is on the last bottom. This is easily determinable by the computer since all the sample points of the last bottom LB are within the feather line FL of the last, as illustrated in FIG. 2, and as detected during the digitizing operation and stored in the feather line file 6 (FIG. 1).

If the sample point is on the last bottom, as indicated by an "on" flag, the X-coordinate of the sample point is multiplied by the last bottom grading coefficient KRB, to produce the graded X-coordinate (Xi) for the respective sample point. On the other hand, if the sample point is on the last sides, indicated by an "off" flag, then the X-coordinate of the sample point is multiplied by the grading girth coefficient KR. In both cases, the Z-coordinate of the sample point is multiplied by the length grading coefficient KL.

The grading operation illustrated in the flow diagram of FIG. 12 is completed when all the sample points (e.g., 15,000) have been thus graded.

It will be appreciated that if a last bottom of one grade is to be "held" for another grade, e.g., to minimize tooling costs, then the parameters of such a last bottom would be entered into the computer by the operator according to the man-machine interface flow diagram illustrated in FIG. 8.

It will also be appreciated that any or all of the grading coefficients KL, KR and KRB may have different values with respect to the different portions of the shoe last as indicated in FIG. 11a. In this case, the sample points on the different portions of the shoe last would be flagged, in the same manner as the sample points on the last bottom are flagged in the flow diagram of FIG. 12, and the respective grading coefficient would be applied to the sample points.

FIG. 13 is a diagram illustrating how a "heel-height" holding technique may be applied to the graded last so as to produce a disproportionate change in heel height as illustrated by the broken lines in FIG. 11c; FIG. 14 is a flow diagram illustrating the manner of implementing the heel-height holding technique; and FIGS. 15a and 15b are diagrams illustrating the computations made by the computer when implementing this technique.

With reference first to the flow diagram of FIG. 14, the graded last produced by the abovedescribed grading operation, before applying the "heel-holding" procedure, is displayed in display $DISP_2$ (FIG. 1), therein appearing in the form of the full lines of FIG. 13. The operator then selects a pivot point "P" on the turning center line TCL, and a point "O" on the heel part of the last; and, by manipulating the controls of the display, pivots the displayed graded last about pivot point P to the desired heel height. The thus-pivotted last is indicated by the broken-lines in FIG. 13. It will thus be seen that the graded heel height before pivotting is indicated at $H_G$, and the "hold" heel height is indicated at $H_H$.

The computer measures the angle ($\alpha$) between the original line TCL and the pivotted line $\overline{TCL}$, and also measures the dimension "l" between the original point "O", and the corresponding point "$\overline{O}$" after pivotting. The computer then converts each of the sample points "a" before pivotting to the corresponding values "$\overline{a}$" after pivotting, in the following manner as illustrated in FIGS. 15a and 15b.

Figure 15A:
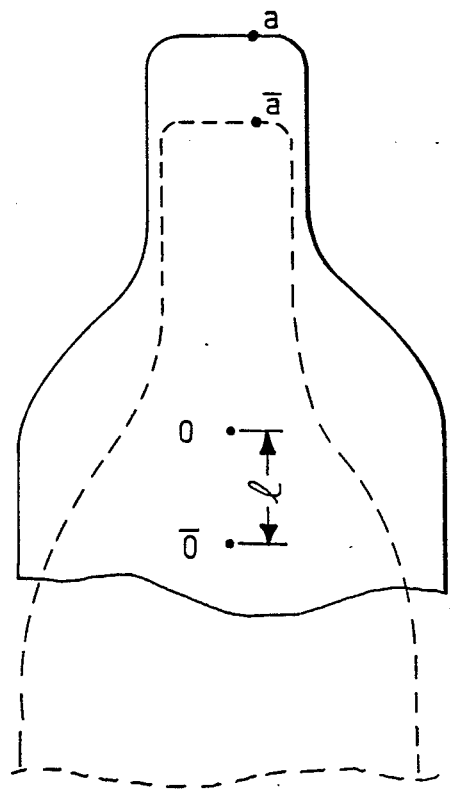
FIGS. 15a and 15b are diagrams helpful in explaining the manner of modifying the digital data identifying each sample point on the surface contour of the last according to the "holding" technique applied to the last.
Figure 15B:
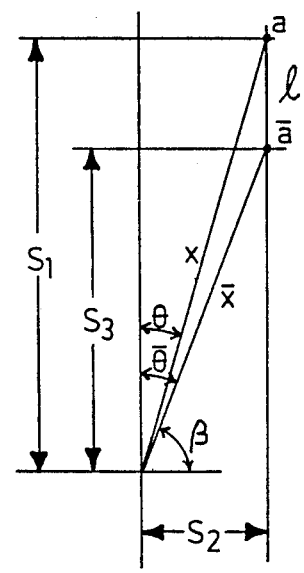

FIG. 15a illustrates the slice along plane AA of FIG. 13; the graded model last is shown in full lines before "correction", and in broken lines after correction. Point "a" in FIG. 15a is any one of the (e.g., 15,000) sample points on the outer contour of the graded last before correction; the sample point is defined by the distance "X" along the X-axis, and the angle $\theta$ about the turning center line TCL. Point "$\overline{a}$" represents the corresponding point on the contour after correction, this point being fixed by determining the corresponding parameter "$\overline{X}$" and "$\overline{\theta}$" after correction.

The diagram of FIG. 15b illustrates how "$\overline{X}$" and "$\overline{O}$" are determined, using the following equations and the measured value "l", namely the distance between "O" and "$\overline{O}$" in the slice AA:

$$S_1 = X \cdot \cos\theta$$

$$S_3 = S_1 - l$$

$$S_2 = X \cdot \sin\theta$$

$$X = \sqrt{S_3^2 + S_2^2}$$

$$\beta = \text{Arc Tan}\left(\frac{S_3}{S_2}\right)$$

$$\overline{\theta} = 90° - \beta$$

The foregoing calculation is made for fixing each of the sample points "a" on the contour of the graded last in the plane AA.

After the values of "a" have been determined in the plane AA, the corresponding values are determined for all the other planes through the graded last. This is done by changing the value "l" while maintaining the same angle "α".

FIGS. 13, 14, 15 and 15b thus illustrate the manner of converting the sample points for applying a "heel" holding technique to the graded last. It will be appreciated that basically the same procedure may be followed when applying a "toe-spring" or "toe-thickness" holding technique to the graded last. It will also be appreciated that instead of pivotting the graded last about one pivot point "P", the graded last may be pitotted about two or more pivot points to implement the desired holding in a more precise manner.

Producing Graded Shoe Components

FIGS. 16a and 16b illustrate how the described method and apparatus may also be used for grading the components utilized in manufacturing the shoes. As indicated earlier, for this purpose style-lines SL are marked on the model last ML (FIGS. 2 and 16a) to indicate the stitching edges of the components, and the digitizer 4 (FIG. 1) produces not only a model last file 5 representing the outer contour of the last, but also a style-line file 7 representing the location of the style-lines SL.

The foregoing operations are also illustrated in the flow diagram of FIG. 16b, wherein it will be seen that the operation of digitizing the model last produces a model last file, e.g., carrying the file name "A1234 B08 DGT", and a style-line file, carrying the corresponding file name "A1234 B08 ANS", but in the style-line file 7.

Both files 5 and 7 are then subjected to the same grading operation as described above with respect to FIGS. 8–15b under the control of the man-machine interface MMI, which specifies the particular parameters of the desired grade as also described above.

As shown in FIG. 16, the grading operation produces a first series of files for the desired grade, in CNC (computerized numerical control) format, and a corresponding series of graded sensor files, namely, the graded files produced from the sensor file which combined the digitized data in the feather line file 6 and the style-line file 7.

The graded sensor files are then used for defining the components of the shoe represented by the graded lasts. This is done under the control of the man-machine interface MMI using keyboard KB$_2$ and display DISP$_2$ (FIG. 1), wherein the operator displays the graded last with the graded style-lines thereon, applies a name to each style-line, and then defines the respective components by three or more such stylelines. For example, component C$_1$ in FIG. 16a would be defined by lines SL2, SL3 and SL4.

The output of this operation is a series of files for each component, each file in the series representing a different grade of the corresponding component. This is illustrated in the flow diagram of FIG. 16b by a first file series representing the different grades of one component, a second file series representing the different grades of a second component, and so on with respect to all the components of the shoe to be graded.

The latter files represent the three dimensional configuration of the graded components. These files are then converted to two-dimensional configurations by known algorithms, thereby producing graded digital files representing the two-dimensional configurations of the components used for manufacturing the shoe. The so-produced files, corresponding to the graded component files 12 in FIG. 1, may thus be used in conventional CNC (computerized numerical control) machines for manufacturing the components.

Laser Digitizer

Figure 17:
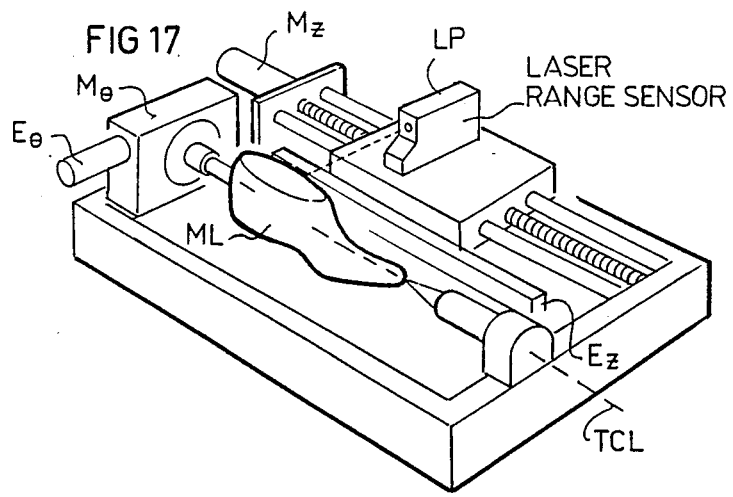
FIG. 17 illustrates an optical digitizer, namely a laser system, which may be used for the digitizer in the system of FIG. 1.
Figure 18:
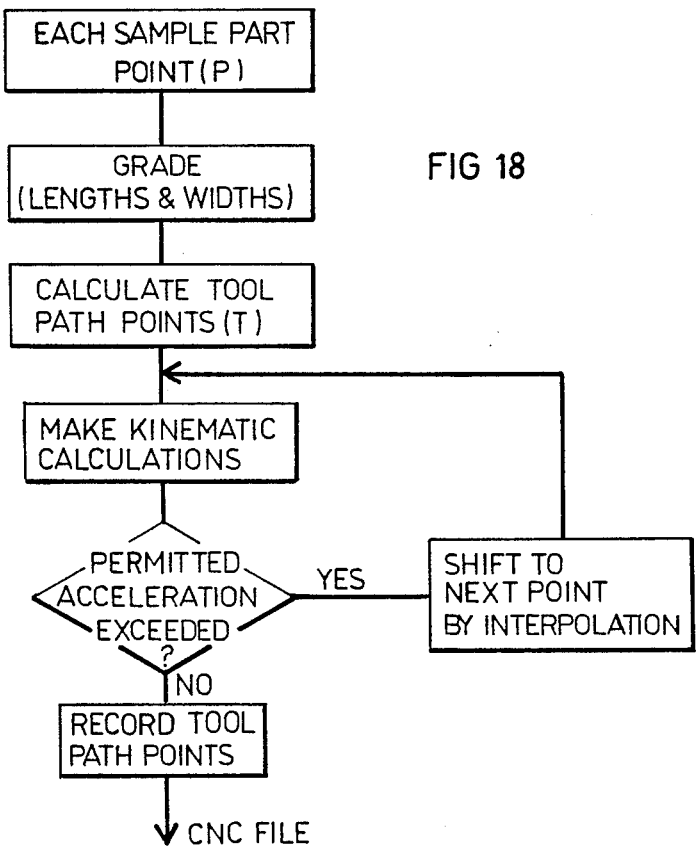
FIG. 18 is a flow diagram illustrating the operation of the grading computer when using the laser digitizer of FIG. 17.

Instead of using a tracer-point type digitizer as illustrated in FIG. 3, there may also be used an optical-type digitizer. FIG. 17 illustrates a laser digitizer which may be used for this purpose, and FIG. 18 illustrates the flow diagrag when using this type of digitizer.

The laser digitizer illustrated in FIG. 17 also includes a rotary motor M$_\theta$ for rotating the model last ML about its turning center line TCL, an encoder E$_\theta$ producing an electrical output representing the instantaneous angular position ($\theta$) of the model last about line TCL; a motor M$_Z$ for driving the laser probe LP along the Z-axis, parallel to line TCL; and an encoder E$_Z$ producing an electrical output representing the instantaneous linear position of the laser probe LP along the Z-axis. The laser digitizer of FIG. 17, however, does not include any means for displacing the laser probe LP about the X-axis, perpendicular to line TCL, nor a corresponding encoder; rather, the laser probe LP itself determines the X-coordinate of the sample point on the surface contour of the model last ML.

Laser probes of this type are known, and therefore particulars of the construction and operation of the laser probe LP are not set forth herein. As one example, the laser probe LP may be the OP2 Laser Scanning Probe distributed by Renishaw, widely used for non-contact measurement of a wide range of components.

It will be appreciated that, whereas the tracer probe TP of FIG. 3 outputs the X-dimension of the sampled points in the form of tool-path points (points T, FIG. 10a, namely, the center point of the tracer wheel), the X-axis coordinate outputs of the laser probe LP in FIG. 17 represent the actual part points (points P, FIG. 10a) on the outer surface of the model last ML being digitized. Thus, the information appearing in the Model Last File 5 outputted by the digitizer computer would be the part points P when the laser probe is used. Accordingly, when the file produced by the laser probe of FIG. 17 is used in the grading computer 4 to produce the graded last files for use in the CNC cutting machine, it is not necessary to convert the tool path points (points T) to the part contact points (points P) before performing the grading operations, as described above with respect to the flow diagram of FIG. 9; rather, this step is omitted when using the laser probe LP.

FIG. 18 is a flow diagram, corresponding to that of FIG. 9, illustrating the operation of the grading computer 8 when the model last file 5 is produced by the laser probe LP digitizer of FIG. 17. Thus, each sample point in the model last file is the part contact point (P), instead of the tool-path point (T) in FIG. 9. The part contact points (P) are then graded for lengths and widths in the same manner as desribed above, and then the tool path points (T) are calculated according to the dimensions of the tool to be used in cutting the last. The kinematic calculations are then made as described above with respect to FIG. 9 to assure that the acceleration and other constraints are not exceeded, before the tool path points are recorded in the produced CNC file.

APPLICATIONS OF THE INVENTION

As indicated above, the described method and apparatus may be embodied in new equipment specifically designed for making shoe lasts or for making the graded components used in manufacturing the shoes. The invention may also be embodied in existing equipment, e.g., of the pantographic type, to retrofit such equipment for making graded shoe lasts. Further, the invention may also be used in CAD/CAM (computer-aided design/computer-aided manufacture) equipment, for changing styles or creating new styles, by enabling the style-designing artisan to display on the screen the image of the model last from the digital data generated by the digitizer computer, and then to manipulate the displayed image, according to the above-described "holding" techniques or other known graphic manipulating techniques, to modify the displayed style or to create new styles.

Many other variations, modifications and applications of the invention may be made.

What is claimed is:

1. A method of making shoe lasts, comprising the operations:
    digitizing a large number of sample points on the outer surface of a model last representing a particular shoe style to produce a model last digital file representing the three-dimensional surface contour of the respective model last;
    grading said model last digital file to produce one or more graded last digital files each representing a different last size of the respective shoe style;
    and utilizing each of said graded last digital files to produce a graded shoe last of the respective shoe style.

2. A method of making shoe lasts, comprising the operations:
    digitizing a large number of sample points on the outer surface of a model last representing a particular shoe style to produce a model last digital file representing the three-dimensional surface contour of the respective model last;
    grading said model last digital file to produce one or more graded last digital files each representing a different last size of the respective shoe style;
    and utilizing each of said graded last digital files to produce a graded shoe last of the respective shoe style.
    wherein the outer surface of the model last is digitized by a tracer probe which is spring-urged into contact with the outer surface of the model last as the model last is continuously rotated about its longitudinal axis and as the tracer probe is advanced parallel to the longitudinal axis of the model last.

3. The method according to claim 2, wherein the digitizing operation measures the instantaneous position of the tracer probe at each sample point to represent the tool path points at the three-dimensional surface contour of the respective model last; and the grading step converts said tool path points to surface points of the model last, grades said surface points to represent different lengths and widths of lasts of the respective shoe style, and then reconverts said graded surface points to graded tool path points in the graded digital files.

4. A method of making shoe lasts, comprising the operations:
    digitizing a large number of sample points on the outer surface of a model last representing a particular shoe style to produce a model last digital file representing the three-dimensional surface contour of the respective model last;
    grading said model last digital file to produce one or more graded last digital files each representing a different last size of the respective shoe style;
    and utilizing each of said graded last digital files to produce a graded shoe last of the respective shoe style.
    wherein the outer surface of the model last is digitized by an optical device directing an optical beam against the outer surface of the model last as the model last is continuously rotated about its longitudinal axis and as the optical beam is advanced parallel to the longitudinal axis of the model last.

5. The method according to claim 4, wherein the digitizing operation directly measures the surface points on the model last, and the grading step grades said surface points to represent different lengths and widths of lasts of the respective shoe style, and then converts said graded surface points to graded tool path points in the graded digital files.

6. A method of making shoe lasts, comprising the operations:
    digitizing a large number of sample points on the outer surface of a model last representing a particular shoe style to produce a model last digital file representing the three-dimensional surface contour of the respective model last;
    grading said model last digital file to produce one or more graded last digital files each representing a different last size of the respective shoe style;
    utilizing each of said graded last digital files to produce a graded shoe last of the respective shoe style;
    digitizing a large number of sample points on the feather line of the model last to produce a feather line digital file representing the feather line of the respective model last;
    and utilizing said feather line digital file, together with said model last digital file, for producing said one or more graded last digital files of the respective shoe style.

7. The method according to claim 6, wherein the outer surface of the model last is digitized by a tracer probe which is spring-urged into contact with the outer surface of the model last as the model last is continuously rotated about its longitudinal axis and as the tracer probe is advanced parallel to the longitudinal axis of the model last.

8. The method according to claim 7, wherein the model last is of electrically-insulating material except for its bottom which is of electrically-conductive material, and wherein said spring-urged tracer probe is of electrically-conductive material, such that the juncture line of the last bottom with the remainder of the last, constituting said feather line, is electrically sensed by said spring-urged tracer probe.

9. The method according to claim 7, wherein the sides of the model last have one optical characteristic and its bottom has another optical characteristic, and the juncture line of the last bottom with the remainder of the last, constituting said feather line, is optically sensed.

10. A method of making shoe lasts, comprising the operations:
digitizing a large number of sample points on the outer surface of a model last representing a particular shoe style to produce a model last digital file representing the three-dimensional surface contour of the respective model last;
grading said model last digital file to produce one or more graded last digital files each representing a different last size of the respective shoe style;
utilizing each of said graded last digital files to produce a graded shoe last of the respective shoe style;
digitizing a large number of sample points on preselected style-lines of the model last to produce a style-line digital file for the respective shoe style;
and utilizing said style-line digital file, together with said model last digital file, for producing one or more graded component digital files each representing a different component size of the respective shoe style.

11. The method according to claim 10, wherein said one or more graded component digital files is produced by defining, from the style-lines in said style-line digital file, one or more shoe components each bounded by at least three style-lines;
grading said model last digital file to produce one or more graded last digital files each representing a different size of the respective shoe style;
extracting from each of said graded last digital files the digital data corresponding to each of said shoe components defined by said at least three style-lines to produce graded component digital data representing the configuration of the respective component in three dimensions;
and converting said three-dimensional graded component digital data to digital data representing said graded component in two dimensions.

12. The method according to claim 10, wherein said preselected style-lines are digitized by an optical device which directs an optical beam against the outer surface of the model last as the model last is continuously rotated about its longitudinal axis and as the optical beam is advanced parallel to the longitudinal axis of the model last.

13. A method of making shoe components, comprising:
digitizing a large number of sample points on the outer surface of a model last representing a particular shoe style to produce a model last digital file representing the three-dimensional surface contour of the respective model last;
digitizing a large number of sample points on preselected style-lines of the model last to produce a style-line digital file for the respective shoe style;
defining, from the data in said style-line digital file, one or more shoe components each bounded by at least three style-lines;
grading said model last digital file to produce one or more graded last digital files each representing a different size of the respective shoe style;
extracting from each of said graded last digital files the digital data corresponding to each of said shoe components defined by said at least three style-lines to produce graded component digital data representing the three-dimensional configuration of the respective component;
converting said three-dimensional graded component digital data to the two-dimensional configuration of the respective component; and
utilizing said two-dimensional graded component digital data to cut the respective components.

14. A method of making shoe components, comprising:
digitizing a large number of sample points on the outer surface of a model last representing a particular shoe style to produce a model last digital file representing the three-dimensional surface contour of the respective model last;
digitizing a large number of sample points on preselected style-lines of the model last to produce a style-line digital file for the respective shoe style;
defining, from the data in said style-line digital file, one or more shoe components each bounded by at least three style-lines;
grading said model last digital file to produce one or more graded last digital files each representing a different size of the respective shoe style;
extracting from each of said graded last digital files the digital data corresponding to each of said shoe components defined by said at least three style-lines to produce graded component digital data representing the three-dimensional configuration of the respective component;
converting said three-dimensional graded component digital data to the two-dimensional graded component digital data to the two-dimensional configuration of the respective component; and
utilizing said two-dimensional graded component digital data to cut the respective components,
wherein said preselected style-lines are digitized by an optical device which directs an optical beam against the outer surface of the model last as the model last is continuously rotated about its longitudinal axis and as the optical beam is advanced parallel to the longitudinal axis of the model last.

15. A method of making shoe lasts, comprising the operations:
digitizing a large number of sample points on the outer surface of a model last representing a particular shoe style to produce a model last digital file representing the three-dimensional surface contour of the respective model last;
grading said model last digital file to produce one or more graded last digital files each representing a different last size of the respective shoe style;
and utilizing each of said graded last digital files to produce a graded shoe last of the respective shoe style,
wherein said grading operation includes the steps:
displaying on a screen one or more of said graded lasts;

manipulating the displayed graded last and modifying its configuration so as to disproportionately change at least one of its dimensions with respect to other dimensions;

and utilizing the so modified configuration of the displayed graded last to produce the respective graded last digital file.

16. Apparatus for use in making shoe lasts, comprising:

rotary drive means for rotating a model last representing a particular shoe style;

digitizing means for digitizing a large number of sample points on the outer surface of said model last to produce a model last digital file representing the three-dimensional surface contour of the respective model last;

and grading means for producing from said model last digital file a plurality of graded last digital files representing different lengths and widths of lasts of the respective shoe style.

17. The appararatus according to claim 16, wherein said digitizing means comprises:

a tracer probe;

rotary drive means for rotating said model last about its longitudinal axis, constituting a first axis;

a first encoder producing an electrical output representing the instantaneous angular position of the model last about said first axis;

a spring urging said tracer probe along a second axis in contact with the outer surface of the model last as the model last is rotated by said rotary drive means about said first axis;

a second encoder producing an electrical output representing the instantaneous position of said tracer probe along said second axis;

linear drive means for driving said tracer probe along a third axis parallel to said first axis;

and a third encoder producing an electrical output representing the instantaneous linear position of the tracer probe along said third axis.

18. The apparatus according to claim 17, wherein said tracer probe is a wheel rollable along the outer surface of the model last while spring-urged into contact therewith.

19. The apparatus according to claim 16, wherein said digitizing means also digitizes a large number of sample points on the feather line of the model last to produce a feather line digital file representing the feather line of the respective model last; and said grading means also utilizes said feather line digital file, together with said model last digital file, for producing said plurality of graded last digital files of the respective shoe style.

20. The apparatus according to claim 19, wherein said model last is of electrically-insulating material except for its bottom, which is of electrically-conductive material; and said digitizing means includes an electrically-conductive probe which is spring-urged into contact with the outer surface of the model last to electrically sense the juncture line of the last bottom with the remainder of the last, said juncture line constituting said feather line.

21. The apparatus according to claim 20, wherein said probe is an electrically-conductive wheel rollable along the outer surface of the model last while spring-urged into contact therewith.

22. The apparatus according to claim 21, wherein said digitizing means further comprises:

a first encoder producing an electrical output representing the instantaneous position of said tracer probe along said first axis;

a second encoder producing an electrical output representing the instantaneous angular position of the model last about said second axis;

linear drive means for driving said tracer probe along a third axis parallel to said second axis;

and a third encoder producing an electrical output representing the instantaneous linear position of the tracer probe along said third axis.

23. The apparatus according to claim 19, wherein said model last has one optical characteristic except for its bottom which has another optical characteristic, and said digitizing means comprises an optical sensor for sensing the juncture line, constituting said feather line, of the bottom of the last with the remainder of the last.

24. The apparatus according to claim 16, wherein said digitizing means comprises an optical device directing an optical beam against the outer surface of the model last as the model last is rotated about its longitudinal axis.

25. The apparatus according to claim 16, wherein said model last includes a plurality of stylelines, and said digitizing means includes style-line digitizing means for digitizing a large number of sample points on said stylelines to produce a styleline digital file for the respective shoe style; and wherein said grading means also includes means enabling extraction from said model last digital file the digital data defining one or more shoe components each identified by at least three lines from said style-line digital file; and means for converting said extracted digital data, representing the three-dimensional configuration of the respective graded component, to correspond to the two-dimensional configuration thereof.

26. The apparatus according to claim 25, wherein said style-line digitizing means includes an optical device which directs an optical beam against the outer surface of the model last as the model last is continuously rotated about its longitudinal axis.

27. Apparatus for use in making components of shoes, comprising:

rotary drive means for rotating a model last, representing a particular shoe style, about its longitudinal axis which model last includes a plurality of style-lines;

digitizing means for digitizing a large number of sample points on the outer surface of the model last to produce a model last digital file representing the three-dimensional surface configuration of the respective model last, and for digitizing a large number of sample points on the style-lines to produce a style-line digital file for the respective style-line;

and grading means utilizing said model last digital file for producing a plurality of graded last digital files representing different last sizes of the respective shoe style;

said grading means including means enabling extraction from said model last digital file the digital data defining one or more shoe components each identified by at least three lines from said style-line digital file; and means for converting said extracted digital data, representing the three-dimensional configuration of the respective graded component, to correspond to the two-dimensional configuration thereof.

28. The apparatus according to claim 27, wherein said digitizing means includes an optical device which directs an optical beam against the outer surface of the model last as the model last is continuously rotated about its longitudinal axis to sense said style-lines and to produce said style-line digital file.

29. The apparatus according to claim 16, wherein said grading means includes:
a display for displaying the graded lasts;
manipulatable means enabling the operator to manipulate the graded lasts displayed and to modifiy its outer configuration so as to disproportionately change at least one of its dimensions with respect to others of its dimensions;
and computer means for modifying the digital data of the graded last to correspond to the modified configuration of the graded last.

* * * * *

UNITED STATES PATENT AND TRADEMARK OFFICE
CERTIFICATE OF CORRECTION

PATENT NO. : 4,817,222

DATED : April 4, 1989

INVENTOR(S) : Aaron Shafin

It is certified that error appears in the above-identified patent and that said Letters Patent is hereby corrected as shown below:

On the title page:

[76] Inventor: Aharon Shafir should read Aaron Shafir.

Signed and Sealed this

Seventeenth Day of July, 1990

Attest:

HARRY F. MANBECK, JR.

*Attesting Officer*      *Commissioner of Patents and Trademarks*